Patented Apr. 12, 1927.

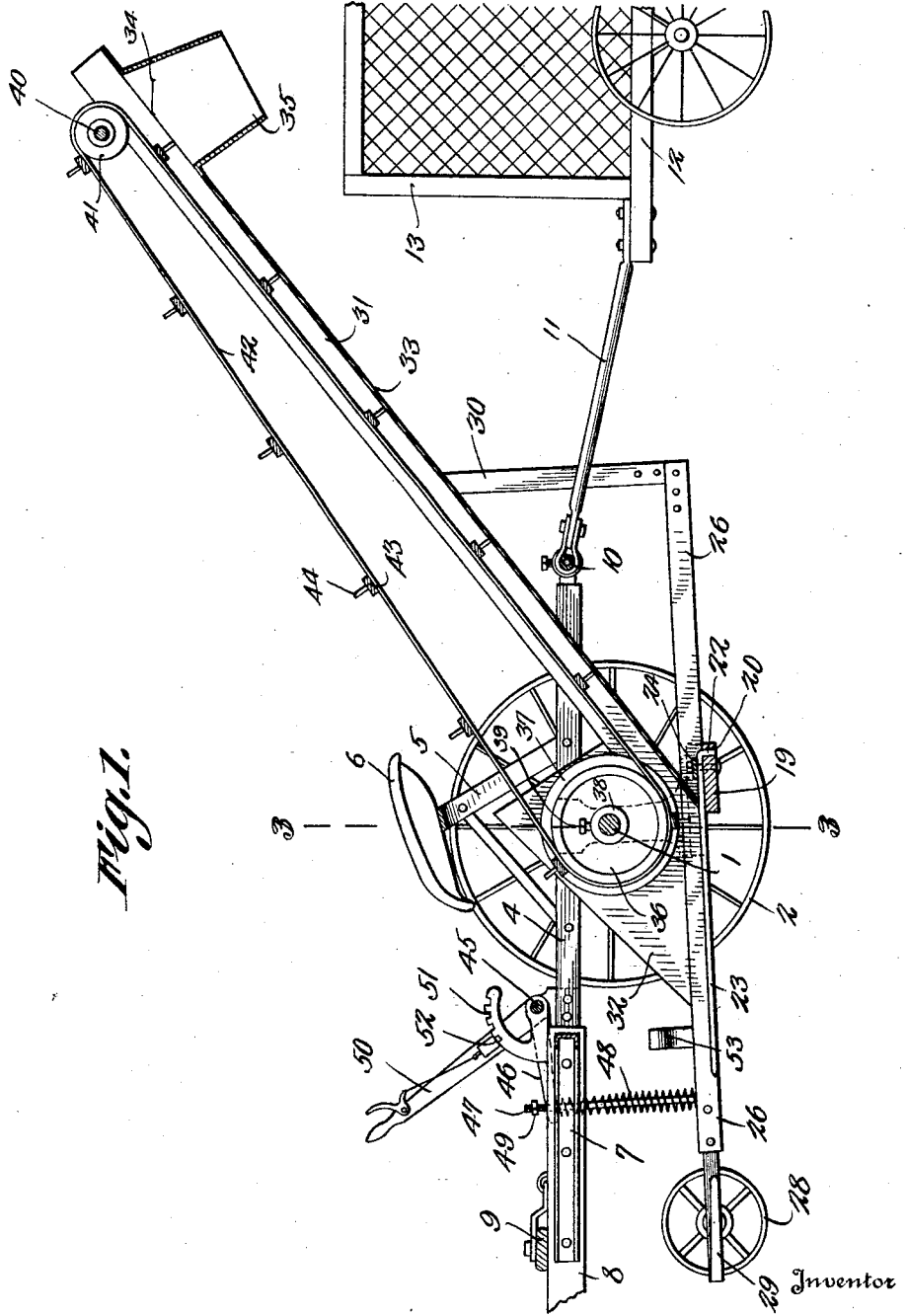

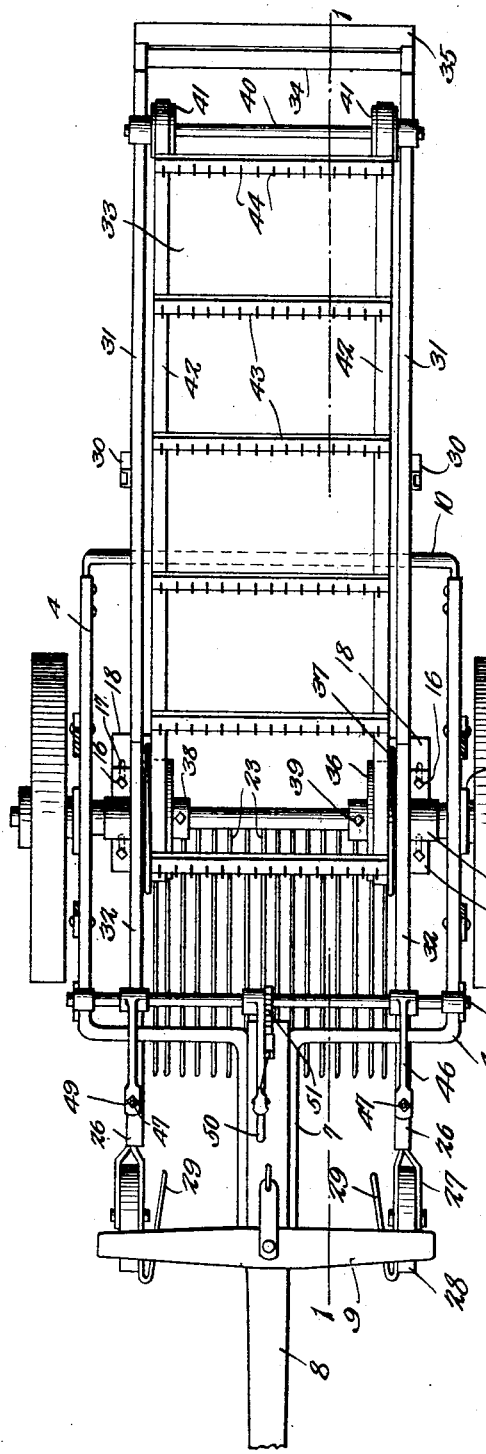

1,624,313

UNITED STATES PATENT OFFICE.

PEET CARLSON, OF MANOR, TEXAS.

COTTON HARVESTER.

Application filed March 9, 1925. Serial No. 14,245.

This invention relates to machines for harvesting cotton and while it can be used advantageously at any time after the ripening of the cotton, it is particularly useful late in the season and in those regions where the season is short.

It is an object of the invention to provide a machine which is simple in construction but which, when drawn along one or more rows of plants, will comb through the plants and tear the bolls therefrom, means being employed whereby the bolls thus gathered will be conveyed, with any trash commingled therewith, to a point of discharge where the material can be directed into a basket, wagon body or other suitable container.

Another object is to provide a harvesting machine which will operate efficiently to gather, hold and elevate the bolls under all conditions, it being impossible for the material to be disturbed by strong air currents.

A further object is to provide a light, durable and compact machine which is easy to operate and adjustable at all times to irregularities in the surface over which the machine is travelling.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings: the preferred form of the invention has been shown.

In said drawings,

Figure 1 is a vertical longitudinal section through the machine on line 1—1 Fig. 2, a portion of a trailer being shown connected thereto to receive the harvested cotton.

Figure 2 is a plan view of the machine.

Figure 3 is a section on line 3—3, Figure 1, some of the parts being removed and other parts being shown in elevation.

Figure 4 is a plan view of a portion of the gathering rake.

Referring to the figures by characters of reference 1 designates a rotatable axle supported by wheels 2. Mounted on this axle adjacent the wheels are bearings 3 supporting the sides of a riding frame 4 to the sides of which are connected suitably braced standards 5 carrying a seat 6 for the driver. The front of the frame 4 has forwardly extending arms 7 between which is secured the rear portion of a draft tongue 8 to which may be connected a whiffletree 9. The rear portion of frame 4 is made up of a cross bar or pipe 10 to which may be connected the front end of a tongue 11 extending from a trailer 12. This trailer may be provided with a large receptacle 13 for receiving harvested cotton or, if preferred, it can support baskets to be successively filled with cotton.

Suspended from the rotatable axle 1 close to the bearings 3 are hangers 14 the bases 15 of which have bolts 16 adapted to extend through longitudinal slots 17 formed in flanges 18 provided at the ends of a cross head 19. In this cross head are parallel series of apertures 20 and 21 respectively. The apertures 20 are designed to receive the down turned rear ends 22 of forwardly extending rake tines or fingers 23. A retaining plate or strip 24 is extended transversely over these tines or fingers and is attached to the cross head 19 by bolts 25 extending between the tines and suitably fastened in the openings 21.

Side beams 26 are mounted on and suitably secured to the end portions of cross head 19 and extend forwardly past the ends of the tines 23. The forward ends of these beams are forked as at 27 and have wheels 28 journaled in the forks. The inner sides of the forks are provided with deflecting or gathering fingers 29 which converge rearwardly.

The rear portions of the beams 26 are provided with standards or frame members 30 and secured on these standards are side boards 31 inclined upwardly and rearwardly and having their lower ends secured on the beams 26 adjacent the ends of the cross head 19. Retaining wings 32 are extended upwardly from the beams 26 at the sides of the series of tines 23 and also from the lower portions of the side boards so that material gathered by the machine cannot discharge laterally therefrom. As shown in Figures 1 and 3 the axle 1 is extended through these retaining wings.

An incline 33, which can be of sheet metal or any other suitable material is fastened to the bottoms or lower longitudinal edges of side boards 31 and the lower end of the incline extends between beams 26 and fits snugly on the back portions of tines 23. This incline is smooth and imperforate and is provided, near its upper end with a transverse outlet 34 opening into a spout or chute 35.

Secured to axle 1 so as to rotate therewith are wheels or pulleys 36 having annular flanges 37 at the outer sides thereof. These pulleys or wheels can be adjusted toward or from each other and any desired means can be used for fastening them to the axle. For example each wheel or pulley may be provided with a hub 38 carrying a set screw 39 for engaging the axle.

A transverse shaft 40 is journaled on the upper portions of the side boards 31 and has pulleys 41 mounted to rotate thereon. Each of these pulleys is engaged by an endless belt 42 which also engages and is adapted to be actuated by one of the pulleys 36. Cross strips 43 connect and are securely fastened to the belts and each of them has a longitudinal series of outstanding prongs or spikes 44. By providing the flanges 37, the elevator formed by the belts 42 and the parts carried thereby is held against lateral displacement relative to the pulleys.

A transverse shaft 45 is journaled on the front portion of frame 4 and has forwardly extending arms 46 in which are slidably mounted rods 47 pivotally connected to the front portions of beams 26. Springs 48 are mounted on the rods and when arms 46 are swung downwardly they will place these springs under compression and force the wheels 28 yieldingly against the surface of the ground. Heads or adjustable nuts 49 are provided on the upper portions of the rods so that when arms 46 are swung upwardly the beams 26 will be lifted. Shaft 45 can be rotated by a lever 50 and any suitable means, such as a toothed segment 51 and a dog 52 can be used for fastening the lever in any position to which it may be shifted.

A foot rest 53 may be connected to the beams 26 to permit depression of the beams 26 at their front ends by the use of the feet of the operator, if so desired.

In operation the machine is drawn along a row of plants and wheels 28 will be kept to the ground either by springs 48 or the feet of the driver so as to maintain the front ends of the tines at the proper distance from the ground. These tines will comb through the plants and as the tines are inclined downwardly and forwardly the combing action will result in the bolls being pulled from the plants. These bolls will be supported by the tines and will be forced backwardly therealong by those portions of the plants crowding between the tines. As the machine moves forwardly the collected bolls will ultimately be brought into the path of the prongs 44. These prongs are moving with the belts 42 and travel downwardly in front of the pulleys 36 into engagement with the bolls which are gathered up by the prongs and drawn upwardly along the incline 33. Finally the bolls are discharged by gravity through the outlet 34 and directed into the container provided for them. The cotton thus collected will be mixed with a certain amount of trash such as hulls, leaves, etc., but the cotton can be separated readily therefrom during the ginning process. Because of the speed with which the cotton can be harvested, it has been found that a machine such as described will effect a great saving in the cost of harvesting.

What is claimed is:

In a cotton harvester a wheel supported axle mounted for rotation, a riding frame tiltably mounted thereon, beams supported from the axle and extending forwardly therebeyond, wheels supporting the forward ends of the beams, plant combing tines supported between the beams, an incline extending from and tiltable with the beams, side boards along the longitudinal edges of the incline, endless belts actuated by the axle and extending longitudinally above the incline, means carried by the belt for slidably engaging the incline and dragging material therealong from the bottom to the top of the incline, a lever on the riding frame under the control of the operator, means for holding said lever against movement, rods extending from the beams, means actuated by the lever for varying the relative positions of the riding frame and the rods and beams when the lever is moved in one direction said means being movable downwardly relative to the rods when the lever is moved in the opposite direction, and springs for transmitting thrust from said rod engaging means to the beams normally to yieldingly maintain in contact with the ground the wheels at the forward ends of the beams, the tines being extended under the axle thereby to transfer harvested material directly from the tines to the belts at the bottom of the incline.

In testimony that I claim the foregoing as my own, I have hereto affixed my signature.

PEET CARLSON.